Patented July 28, 1936

2,049,062

UNITED STATES PATENT OFFICE 2,049,062

MOTOR FUEL CONTAINING OLEFINE POLYMERS AND METHOD OF MAKING THE FUEL

Frank A. Howard, Elizabeth, N. J., assignor to Standard Oil Development Company, a corporation of Delaware No Drawing. Application August 3, 1935, Serial No. 34,602

16 Claims. (Cl. 44—9)

This invention relates to improvements in motor fuels such as gasoline and comprises the addition to the fuel of a high molecular weight, combustible, substantially ash free substance having the property of raising the viscosity materially when present in minute proportions. A principal object of the invention is to provide a product of desirably higher viscosity than straight gasoline preferably characterized by relatively small change of viscosity with change of temperature, the increase in viscosity being sufficient to reduce materially the flow through the carburetor jet. I have found that by the use of the materials hereinafter defined these advantageous properties may be imparted to motor fuel without increasing the tendency to carbon formation, impairing the color, or producing any other adverse effects, for example, decreasing the volatility.

The substance used according to the preferred form of the invention is produced by treating olefines such as isobutylene with boron fluoride or equivalent reagent at low temperature. This method results in the formation of a water-white, viscous material having a molecular weight substantially greater than that of paraffine wax ordinarily ranging from about 1000 to 5000. When isobutylene is polymerized at temperatures of the order of —40° to —100° C. and using catalysts, polymers having molecular weights ranging from 17,000 or 90,000 to 500,000 are obtained. Polymers of any desired molecular weight may be prepared by regulating the temperatures, i. e. where polymers of 500,000 molecular weight are to be prepared, a temperature of —100° C. is maintained and where a polymer of 1000 molecular weight is to be prepared a temperature of 0° C. is maintained. For such processes, it is preferable to use catalysts such as boron fluoride and aluminum chloride, though other catalysts may be used such as sulfuric acid and active clays. These polymers are solids or semi-solid rubbery materials which are all freely soluble in hydrocarbon oils. The polymerization is preferably conducted in the presence of a diluent. This diluent may be used and re-used many times and preferably consists of butane or propane or mixtures thereof with or without ethane or ethylene. The Conradson carbon test (A. S. T. M. No. D189—30) of the material is very favorable, usually approaching a zero rating. This material at ordinary temperature and pressure may have rather the physical characteristics of a pitch (except for its color) than an oil and may be referred to as a synthetic pitch. Although it is referred to herein as a condensation or polymerization product, it will be understood that the invention is not concerned with the mechanism of its formation.

Condensation products of this character may be prepared by treating other olefines such as ethylene, propylene, normal and secondary butylene, and the pentylenes, with boron fluoride.

The olefines referred to are available in very large quantities in the gases from oil cracking processes operated to produce gasoline. Therefore, the present invention may be considered to comprise the use of a derivative of substances formed in the manufacture of the gasoline to be treated.

According to this invention the improved motor fuel is made by cracking gas oil or other gasoline source to produce gasoline and an olefine-containing gas. The gasoline is treated in the usual way. An olefine of the gas, for example, isobutylene, is segregated in a more or less pure form by rectification or by chemical means such as conversion of the isobutylene into tertiary butyl alcohol, which is then decomposed to re-form the isobutylene. The latter is then polymerized with very small quantities, for example one per cent of boron fluoride at a low temperature, for example 0° F., and the product is added to the gasoline in the required quantities to give the improved result as indicated below.

Although the commercial aspect of the invention at the present time involves the securing of the olefines from cracked gases, it will be understood that any convenient source of the olefines, for example isobutyl alcohol synthesized from carbon monoxid and hydrogen, may be utilized.

The following specific example will illustrate the invention: To motor gasoline having the following inspection, (Table A) 0.10% by volume of the synthetic pitch prepared from isobutylene is added with a resultant increase of kinematic viscosity of about 4%, that is, from about .0065 to .0068. Comparative Ostwald viscosities are given in Table B. Comparative Ostwald viscosities where synthetic pitches of various molecular weights are used are given in Table C.

Table A

Gasoline inspection

| | |
|---|---|
| Initial B. P. | 97° F. |
| Percent off 212° F. | 32. |
| Final B. P. | 406° F. |
| Sp. Gr. | .598. |
| Sulfur | .088. |

Table B

Ostwald viscosity in stokes

|  | 77° F. | 100° F. |
|---|---|---|
| Untreated | .0065 | .0058 |
| .1% | .0068 | .0061 |
| .5 | .0076 | .00675 |
| 1% | .0100 | .0089 |

Table C

| Polymers used | | Ostwald viscosity stokes—100° F. | | |
|---|---|---|---|---|
| Molecular weight | Concentration in gasoline | Gasoline | | |
| | Base—% | Base | Blend | Increase |
| 2000 | 0.5 | .0058 | .0060 | .0002 |
| 2000 | 1.0 | .0058 | .00615 | .00035 |
| 4500 | 0.5 | .0058 | .00621 | .00041 |
| 4500 | 1.0 | .0058 | .00643 | .00063 |
| 4600 | 1.0 | .0068 | .0068 | .00064 |
| 17,000 | 0.14 | .00624 | .00672 | .00048 |
| 17,000 | 0.28 | .00624 | .00712 | .00088 |
| 90,000 | 0.03 | .00624 | .00676 | .00052 |
| 275,000 | 0.01 | .00640 | .00695 | .00055 |
| 270,000 | 0.01 | .00430 | .00668 | .00038 |
| 270,000 | 0.01 | .00582 | .00620 | .00038 |

The result of the increase of viscosity is to reduce the consumption of motor fuel by the engine, especially where the fuel supply is regulated by the depression produced at the throat of a Venturi tube or similar device in a carburetor of conventional design.

The synthetic pitch dissolves readily in the gasoline. Improved results are obtained by adding also to the gasoline small quantities of relatively involatile petroleum oil, for example, gas oil or light lubricating oil in amount from one-half to three times the volume of the synthetic pitch. Where synthetic pitches of higher molecular weights are used, heavier lubricating oils are added in larger amounts, from .05% to 2% of the volume of the gasoline. In general the synthetic pitch will be used in amounts between the volume per cents 0.02 and 1%. When the polymerized product used is less effective in raising the viscosity, it is sometimes necessary to use larger quantities to obtain a result equivalent to that with the described polymer from isobutylene.

It will be understood that the gasoline given is merely for illustration. Any gasoline, or, for that matter, any low viscosity motor fuel consisting mainly of hydrocarbons, may be treated with the synthetic pitch with or without the additional oils as described. The viscosity of the motor fuel is increased and the change of viscosity with temperature is decreased. The invention is applicable also to gasolines containing anti-knock components, such as lead tetraethyl, benzol, alcohols, and the like, gum inhibitors, etc.

The present application is a continuation-in-part of copending application Ser. No. 609,505 filed May 5, 1932.

The foregoing description is merely illustrative and various changes may be made within the scope of the appended claims in which it is my intention to claim all novelty inherent in the invention as broadly as the prior art permits.

I claim:

1. A motor fuel having added thereto a preformed combustible and substantially ash free substance having a molecular weight substantially greater than that of paraffin wax, in a minute quantity having the property of materially increasing the viscosity of the motor fuel and of improving the viscosity-temperature relationship.

2. A motor fuel containing a small amount of a preformed synthetic pitch formed from hydrocarbons and characterized by the major part thereof having a molecular weight between about 1000 and 5000 and a Conradson carbon value approaching zero.

3. A motor fuel to which has been added a minute amount of a preformed combustible and substantially colorless hydrocarbon substance having a molecular weight in excess of 1000, which has the property of materially increasing the viscosity of the fuel and which does not impair the color of the fuel.

4. A motor fuel to which has been added a preformed minute amount of a high molecular weight viscous polymer of isobutylene having the property of increasing the viscosity of the motor fuel and of improving the viscosity-temperature relationship.

5. A motor fuel to which has been added a minute amount of a preformed viscous polymer formed by treating an olefine with boron fluoride and having the property of increasing the viscosity of the motor fuel and of improving the viscosity-temperature relationship.

6. A motor fuel to which has been added a minute amount of a preformed viscous polymer formed by treating isobutylene with boron fluoride, and having the property of increasing the viscosity of the motor fuel and of improving the viscosity-temperature relationship.

7. A motor fuel containing from 0.02% to 1% by volume of a preformed viscous olefine polymer having the property of increasing the viscosity of the motor fuel and of improving the viscosity-temperature relationship.

8. A motor fuel containing from 0.02% to 1% of a preformed viscous polymer of isobutylene having the property of increasing the viscosity of the motor fuel and of improving the viscosity-temperature relationship.

9. Method of making motor fuel, comprising adding to the fuel a small amount of a preformed pitch-like olefine polymer having the property of increasing the viscosity of the motor fuel and of improving the viscosity-temperature relationship.

10. A motor fuel of improved viscosity-temperature relationship comprising a gasoline to which has been added a small amount of a preformed viscous polymer having a molecular weight in excess of 1000 and formed by polymerization of isobutylene in the presence of boron fluoride at a temperature below 10° below zero degrees centigrade.

11. A motor fuel having added thereto a preformed, combustible and substantially ash-free substance having a molecular weight above 17,000, in a minute quantity having the property of materially increasing the viscosity of the motor fuel and of improving the viscosity-temperature relationship.

12. A motor fuel containing a small amount of a preformed synthetic polymer formed from hydrocarbons and characterized by the major part thereof having a molecular weight between about 17,000 and 500,000 and a Conradson carbon value approaching zero.

13. A motor fuel comprising a preformed minute amount of a high molecular weight of at least 17,000, viscous polymer of isobutylene having the property of increasing the viscosity of the motor fuel and of improving the viscosity-temperature relationship.

14. A motor fuel comprising .01% of a preformed viscous polymer of at least 17,000 molecular weight, formed by treating an olefine with boron fluoride, and having the property of increasing the viscosity of the motor fuel and of improving the viscosity-temperature relationship.

15. A motor fuel comprising .01% of a preformed viscous polymer having a molecular weight of 270,000 formed by treating isobutylene with boron fluoride and having the property of increasing the viscosity-temperature relationship.

16. A motor fuel of improved viscosity-temperature relationship comprising a gasoline to which has been added a small amount of a preformed viscous polymer having a molecular weight in excess of 17,000, and formed by the polymerization of isobutylene in the presence of boron fluoride at a temperature below 40° below zero degrees centigrade.

FRANK A. HOWARD.